US011929520B2

(12) United States Patent
Ahn et al.

(10) Patent No.: US 11,929,520 B2
(45) Date of Patent: Mar. 12, 2024

(54) POROUS SEPARATOR WITHOUT POLYOLEFIN SUBSTRATE INCLUDING INORGANIC PARTICLES AND POLYMER BINDER

(71) Applicant: LG CHEM, LTD., Seoul (KR)

(72) Inventors: Kyoung Ho Ahn, Daejeon (KR); Kwan Woo Nam, Daejeon (KR); Chul Haeng Lee, Daejeon (KR); Young Duk Kim, Daejeon (KR); Je An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 560 days.

(21) Appl. No.: 16/976,859

(22) PCT Filed: Apr. 17, 2019

(86) PCT No.: PCT/KR2019/004646
§ 371 (c)(1),
(2) Date: Aug. 31, 2020

(87) PCT Pub. No.: WO2019/221401
PCT Pub. Date: Nov. 21, 2019

(65) Prior Publication Data
US 2021/0005859 A1    Jan. 7, 2021

(30) Foreign Application Priority Data
May 14, 2018    (KR) .......................... 10-2018-0055138

(51) Int. Cl.
H01M 50/446    (2021.01)
C08K 3/22    (2006.01)
H01M 10/0525    (2010.01)
H01M 50/443    (2021.01)
H01M 50/489    (2021.01)

(52) U.S. Cl.
CPC ............. H01M 50/446 (2021.01); C08K 3/22 (2013.01); H01M 50/443 (2021.01); H01M 50/489 (2021.01); C08K 2003/2227 (2013.01); H01M 10/0525 (2013.01)

(58) Field of Classification Search
CPC ............. H01M 50/446; H01M 50/489; H01M 50/443; C08K 3/22
USPC .................................................. 429/251, 254
See application file for complete search history.

(56) References Cited

U.S. PATENT DOCUMENTS

| 6,183,901 | B1 | 2/2001 | Ying et al. |
| 7,385,089 | B2 | 6/2008 | Costello et al. |
| 8,883,354 | B2 | 11/2014 | Carlson et al. |
| 9,180,412 | B2 | 11/2015 | Jo et al. |
| 10,199,692 | B2 | 2/2019 | Kim et al. |
| 10,243,239 | B1 | 3/2019 | Ahn et al. |
| 10,497,972 | B2 | 12/2019 | Lee et al. |
| 2006/0046149 | A1 | 3/2006 | Yong et al. |
| 2007/0163710 | A1 | 7/2007 | Costello et al. |
| 2010/0316903 | A1 | 12/2010 | Kim et al. |
| 2012/0003524 | A1 | 1/2012 | Jo et al. |
| 2015/0288028 | A1* | 10/2015 | DeSimone .......... H01M 8/1025 429/402 |
| 2016/0056438 | A1 | 2/2016 | Kim et al. |
| 2016/0190536 | A1 | 6/2016 | Park et al. |
| 2016/0351956 | A1 | 12/2016 | Lee et al. |
| 2017/0133720 | A1 | 5/2017 | Kim et al. |
| 2017/0222244 | A1 | 8/2017 | Kim et al. |
| 2018/0212219 | A1 | 7/2018 | Kim et al. |
| 2019/0058217 | A1* | 2/2019 | Ahn ........................ C08L 71/02 |

FOREIGN PATENT DOCUMENTS

| CN | 101874319 A | 10/2010 |
| CN | 103035940 A | 4/2013 |
| CN | 104269509 A | 1/2015 |
| JP | H11-66949 A | 3/1999 |
| JP | 2007-035544 A | 2/2007 |
| JP | 2011187274 A * | 9/2011 |
| JP | 2012-069457 A | 4/2012 |
| JP | 2012069457 A * | 4/2012 |
| JP | 2015-144082 | 8/2015 |
| JP | 2016-139604 A | 8/2016 |
| KR | 10-2007-0010962 A | 1/2007 |
| KR | 10-2008-0080320 A | 9/2008 |
| KR | 10-2011-0010516 A | 2/2011 |
| KR | 10-2011-0116489 A | 10/2011 |
| KR | 10-2013-0047801 A | 5/2013 |
| KR | 10-2016-0040128 A | 4/2016 |
| KR | 10-2016-0043768 A | 4/2016 |
| KR | 2016043768 A * | 4/2016 |

(Continued)

OTHER PUBLICATIONS

Rolland et al., Solvent-Resistant Photocurable "Liquid Teflon" for Microfluidic Device Fabrication, 02/20004, Journal of American Chemical Society, 126, 2322-2323 (Year: 2004).*
Hu et al., Photochemically Cross-Linked Perfluoropolyether-Based Elastomers: Synthesis, Physical Characterization, and Biofouling Evaluation, Aug. 2009, Macromolecules, 42, 6999-7007 (Year: 2009).*
Cheng et al., "Thermal shutdown behavior of PVdF-HFP based polymer electrolytes comprising heat sensitive cross-linkable oligomers," Journal of Power Sources, 144 (2005) 238-243.
Holtmann et al., "Boehmite-based ceramic separator for lithium-ion batteries," Journal of Applied Electrochemistry, 69 (2016) 1-8.
Raja et al., "Thin, flexible and thermally stable ceramic membranes as separator for lithium-ion batteries," Journal of Membrane Science, 471 (2014) 103-109.

(Continued)

Primary Examiner — Sean P Cullen
(74) Attorney, Agent, or Firm — Morgan, Lewis & Bockius LLP

(57) ABSTRACT

Disclosed herein is a porous separator for electrochemical devices, configured to guarantee electrical insulation between a positive electrode and a negative electrode, wherein the porous separator includes no polyolefin substrate, and includes inorganic particles, a binder for coupling between the inorganic particles, and a crosslinking agent.

14 Claims, No Drawings

(56) References Cited

FOREIGN PATENT DOCUMENTS

| KR | 10-2016-0140211 A | 12/2016 | | |
|----|-------------------|---------|---|---|
| KR | 10-2017-0007434 A | 1/2017 | | |
| KR | 10-2017-0007850 A | 1/2017 | | |
| KR | 10-2017-0025434 A | 3/2017 | | |
| KR | 10-2017-0092327 A | 8/2017 | | |
| WO | WO-2018044128 A1 | * | 3/2018 | ......... C08G 65/3322 |

OTHER PUBLICATIONS

International Search Report (with partial translation) and Written Opinion issued in corresponding International Patent Application No. PCT/KR2019/004646, dated Jul. 29, 2019.

Son et al., "Synthesis and Characteristics of Hard Coating Solution Using Colloidal Silica and Organic Silane through Sol-Gel Process," Applied Chemical Engineering, 22:6 (2011) 691-696 (see English abstract).

Extended European Search Report issued by the European Patent Office dated Mar. 12, 2021 in corresponding European patent application No. 19803051.2.

Shin et al., "Cross-linked Composite Gel Polymer Electrolyte using Mesoporous Methacrylate-Functionalized SiO2 Nanoparticles for Lithium-Ion Polymer Batteries," Scientific Reports, vol. 6, No. 1, (2016) XP055744629.

* cited by examiner

POROUS SEPARATOR WITHOUT POLYOLEFIN SUBSTRATE INCLUDING INORGANIC PARTICLES AND POLYMER BINDER

This application claims priority to and the benefit of Korean Patent Application No. 2018-0055138 filed on May 14, 2018, the disclosure of which is hereby incorporated by reference herein in its entirety.

TECHNICAL FIELD

The present invention relates to a separator having no separator substrate, and more particularly to a separator that does not include a polyolefin substrate, which is used as a separator substrate, and includes inorganic particles, and a polymer binder for coupling between the inorganic particles.

BACKGROUND ART

With the trends toward reducing the weight and increasing the functionality of portable devices, such as smartphones, laptop computers, tablet PCs, and portable game machines, the demand for a secondary battery serving as a driving power source thereof is increasing. In the past, nickel-cadmium, nickel-hydrogen, and nickel-zinc batteries have been used, but lithium secondary batteries, which have high operating voltage and high energy density per unit weight, are most frequently used at present.

With the growth of markets related to the portable device market, the demand for lithium secondary batteries has increased. Lithium secondary batteries have also come to be used as the power sources for electric vehicles (EV), hybrid electric vehicles (HEV) and storage of renewable energy.

A lithium secondary battery is configured such that an electrode assembly having a positive electrode/separator/negative electrode structure, which can be charged and discharged, is mounted in a battery case. Each of the positive electrode and the negative electrode is manufactured by applying a slurry including an electrode active material to one surface or both surfaces of a metal current collector, drying the slurry, and rolling the metal current collector having the dried slurry applied thereto.

The separator is one of the most important factors that affect the performance and the lifespan of a secondary battery. It is necessary for the separator to electrically isolate the positive electrode and the negative electrode from each other and to exhibit ion permeability and mechanical strength such that an electrolytic solution can pass smoothly through the separator. As the applications of high-energy lithium secondary batteries are expanded, safety of the separator at high temperature is also needed.

A separator including a separator substrate, which is conventionally used, and an inorganic coating layer has a problem in that the force of adhesion between the separator and an electrode is not sufficient due to its material characteristics, whereby the separator and the electrode are locally separated from each other or wrinkles are formed at the interface between the separator and the electrode, depending on the manufacturing process. Polyolefin, which is generally used as the separator substrate, has a problem with thermal stability in which polyolefin melts at a high temperature.

In order to solve these problems, a separator including an inorganic coating layer alone without a polyolefin separator substrate has been proposed. However, the separator has a problem in that the separator exhibits very low electrical insulation, whereby the separator is vulnerable to a short circuit which occurs in a battery when applying to an electrochemical device. In addition, the separator is easily torn due to the low tensile force and low elongation thereof. As a result, there is a fatal drawback in that a micro-scale short circuit occurs in an electrode assembly.

Patent Document 1 discloses a separator constituted by a micro-porous polymer layer including organically reformed aluminum boehmite and an organic polymer. However, this patent document does not suggest a solution such as polymerization to increase the strength of the separator.

Patent Document 2 relates to an electrolyte for lithium batteries, a negative electrode including the electrolyte, and a lithium battery, and discloses an intermediate layer comprising an electrolyte and a solid electrolyte interposed between a positive electrode and a negative electrode, wherein the intermediate layer serves as a separator. This patent document has a structure corresponding to the present invention in that the electrolyte is interposed between the positive electrode and the negative electrode or may include the separator. However, this patent document is different from the present invention in that a surface-modified nanoparticle composite is dispersed in a block copolymer. In addition, Patent Document 2 only describes the effect of surface modification of the nanoparticle.

Non-patent Document 1 discloses crosslinking of PVdF-HFP/PEGDMA (polyethylene glycol dimethacrylate). In Non-patent Document 1, however, the above-specified material is not applied to the separator but is applied only to a polymer electrolytic solution.

Non-patent Document 2 discloses a separator for lithium secondary batteries, made of boehmite nanoparticles and polyvinylidene fluoride polymer. However, it is noted that this separator is not suitable for a high-stress battery cell assembly process.

Non-patent Document 3 discloses a porous ceramic film based on magnesium aluminate as a separator for lithium secondary batteries exhibiting high flexibility and thermal stability. However, this non-patent document does not disclose a method for increasing the strength of the separator.

That is, an effective technology that is capable of providing a separator having no polyolefin substrate, wherein the separator exhibits high stability in a high-temperature environment, high insulation, higher tensile strength and elongation, excellent electrolytic impregnation characteristic, and high ion transfer ability, thereby solving the above problems, has not yet been suggested.

RELATED ART DOCUMENT (Patent Document 1) U.S. Registered Patent No. 8883354
(Patent Document 2) Korean Patent Application Publication No. 2016-0140211
(Non-patent Document 1) Thermal shutdown behavior of PVdF-HFP-based polymer electrolytes comprising heat sensitive cross linkable oligomers, J. Power Sources 144, 2005
(Non-patent Document 2) Boehmite-based ceramic separator for lithium-ion batteries, Journal of Applied Electrochemistry, 2016, 69
(Non-patent Document 3) Thin, flexible and thermally stable ceramic membranes as separator for lithium-ion batteries, Journal of Membrane Science, 2014, 103

DISCLOSURE

Technical Problem

The present invention has been made in view of the above problems, and it is an object of the present invention to provide a technology that is capable of preventing the occurrence of a short circuit in a battery due to damage to a separator and a separator to which the technology is applied by using a separator including no polyolefin substrate and having a structure including inorganic particles and a binder for coupling between the inorganic particles, thereby having high stability in a high temperature environment, high insulation, excellent electrolyte impregnation characteristic, high ion transfer ability and higher tensile strength and elongation than a conventional separator while guaranteeing insulation corresponding to the insulation of the conventional separator.

Technical Solution

In accordance with an aspect of the present invention, the above and other objects can be accomplished by the provision of a porous separator for electrochemical devices configured to guarantee electrical insulation between a positive electrode and a negative electrode, wherein the porous separator may include no polyolefin substrate and may be prepared by mixing a composition for a separator comprising inorganic particles, a polymer binder for coupling between the inorganic particles, and a crosslinking agent, coating, drying and then crosslinking the crosslinking agent, wherein a content of the crosslinking agent in the composition is greater than 0 wt % and equal to or less than 5 wt % of a total weight of a solid body in the porous separator.

The crosslinking agent may be represented by the following Chemical Formulas.

Chemical Formula 1

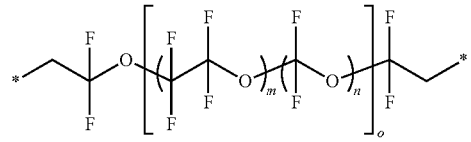

Chemical Formula 2

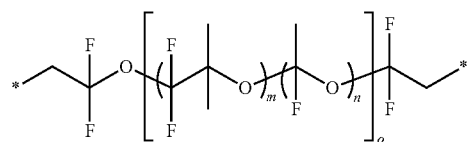

Chemical Formula 3

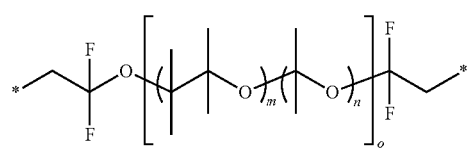

In Chemical Formulas 1 to 3, m is an integer of 1 to 100, n is an integer of 0 to 30, and o is an integer of 1 to 1,000. A weight average molecular weight of Chemical Formulas 1 to 3 is 1,000 to 100,000.

Chemical Formula 4

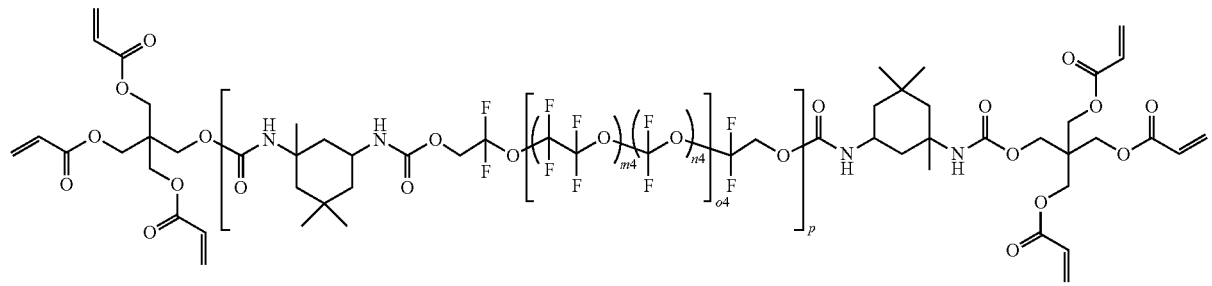

In Chemical Formula 4, m4 is an integer of 1 to 100, n4 is an integer of 0 to 30, and o4 is an integer of 1 to 1,000. A weight average molecular weight of Chemical Formula 4 is 1,000 to 100,000 and p is a variable dependent thereon.

Chemical Formula 5

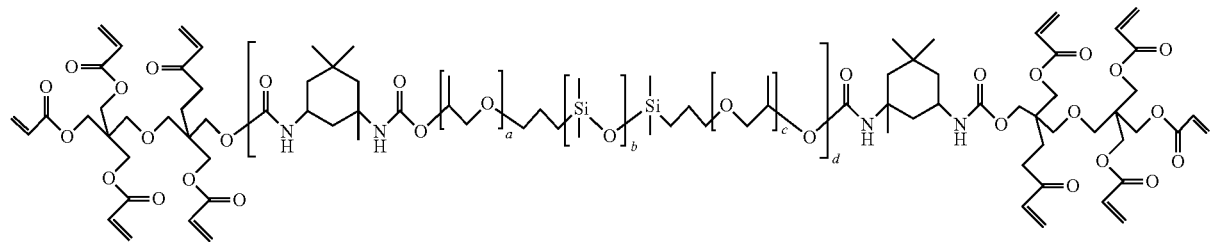

In Chemical Formula 5, a and c are an integer of 1 to 30, b is an integer of 1 to 1,000. A weight average molecular weight is 1,000 to 100,000.

The inorganic particles may be high-dielectric inorganic particles having a dielectric constant of 1 or more, inorganic particles having piezoelectricity, inorganic particles having lithium ion transfer ability, alumina hydrate, or a mixture of two or more thereof, preferably at least one selected from the group consisting of $Al_2O_3$, AlOOH, $SiO_2$, MgO, $TiO_2$ and $BaTiO_2$.

The polymer binder may be at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene terpolymer (EPDM), sulfonated EPDM, styrene butadiene rubber (SBR), TFE, fluoro rubber, and polyimide. Preferably, the polymer binder may be at least one selected from the group consisting of PVdF, TFE and polyimide.

The porous separator may further comprise an initiator and/or a reaction catalyst and the reaction temperature of the crosslinking agent may be 120° C. to 160° C.

The initiator may be an azo-based compound or a peroxide-based compound. For example, the azo-based compound may be at least one selected from among 2,2'-azobis(2-methylbutyronitrile), 2,2'-azobis(isobutyronitrile), 2,2'-azobis(2,4-dimethylvaleronitrile), and 2,2'-azobis(4-methoxy-2,4-dimethylvaleronitrile). Preferably, the azo-based compound may be 2,2'-azobis(isobutyronitrile).

The peroxide-based compound may be at least one selected from among tetramethylbutyl peroxyneodecanoate, bis(4-butylcyclohexyl)peroxydicarbonate, di(2-ethylhexyl) peroxydicarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethylhydroxybutyl peroxyneodecanoate, amyl peroxyneodecanoate, Atofina, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide.

It is desirable that the thickness of the porous separator may range from 5 μm to 30 μm.

The content of the crosslinking agent may be greater than 2 wt % and equal to or less than 20 wt % of a total weight of a solid body in the porous separator and the porous separator may have an air permeability of 50 sec/100 cc to 4,000 sec/100 cc.

The present invention provides an electrochemical device including a porous separator for electrochemical devices in accordance with an aspect of the present invention.

BEST MODE

Now, the present invention will be described in detail with reference to the accompanying drawings. It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best method. Consequently, the embodiments described in this specification are merely the most preferred embodiments and do not cover all technical ideas of the present invention, and therefore it should be understood that there may be various equivalents and modifications capable of substituting for the embodiments at the time of filing of the present application.

In accordance with an aspect of the present invention, there is provided a porous separator for electrochemical devices configured to guarantee electrical insulation between a positive electrode and a negative electrode, wherein the porous separator may include no polyolefin substrate and may include inorganic particles, a polymer binder for coupling between the inorganic particles, and a crosslinking agent.

Compared to a conventional separator, the porous separator according to the present invention does not include a polyolefin-based separator substrate. The conventional separator includes a polyolefin-based separator substrate, to one surface of which an inorganic layer including an inorganic material and a binder is applied. In the present invention, however, the conventional separator substrate is omitted, and the porous separator is made of materials constituting an inorganic layer.

On the other hand, as another conventional separator, there is a separator including an inorganic layer alone as a separator. The overall strength of the conventional separator becomes low, since the separator includes no polyolefin separator substrate. As a result, the separator interposed between the electrode assemblies may be damaged, whereby a short circuit may occur.

1) Crosslinking Agent

The crosslinking agent may be represented by the following Chemical Formulas.

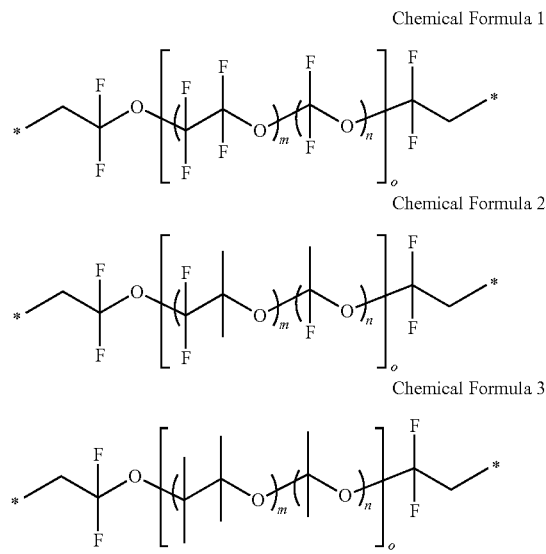

Chemical Formula 1

Chemical Formula 2

Chemical Formula 3

In Chemical Formulas 1 to 3, m is an integer of 1 to 100, n is an integer of 0 to 30, and o is an integer of 1 to 1,000. A weight average molecular weight of Chemical Formulas 1 to 3 is 1,000 to 100,000.

Chemical Formula 4

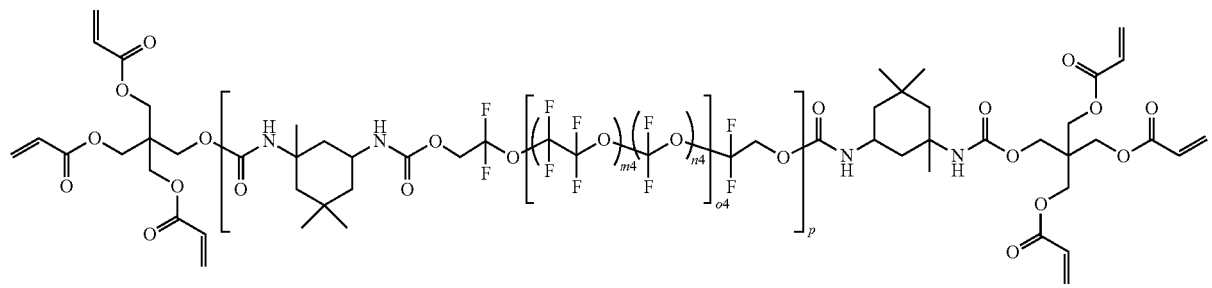

In Chemical Formula 4, m4 is an integer of 1 to 100, n4 is an integer of 0 to 30, and o4 is an integer of 1 to 1,000. A weight average molecular weight of Chemical Formula 4 is 1,000 to 100,000 and p is a variable dependent thereon.

Chemical Formula 5

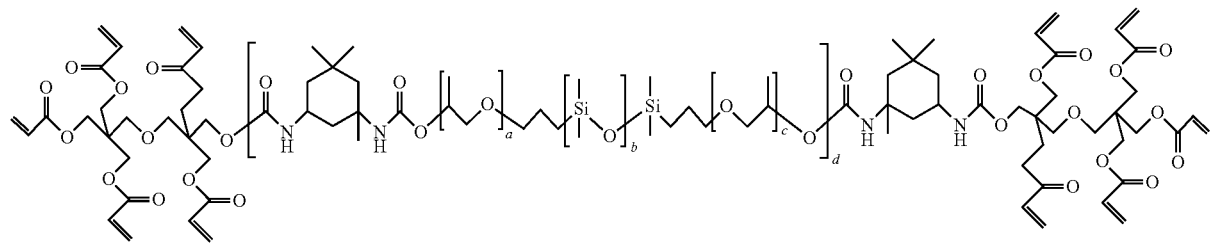

In Chemical Formula 5, a and c are an integer of 1 to 30, b is an integer of 1 to 1,000. A weight average molecular weight is 1,000 to 100,000.

The content of the crosslinking agent may be greater than 2 wt % and equal to or less than 20 wt %, preferably greater than 2 wt % and equal to or less than 10 wt %, more preferably greater than 2 wt % and equal to or less than 8 wt %, much more preferably greater than 3 wt % and equal to or less than 7 wt %, and most preferably 4 wt % and equal to or less than 6 wt % of a total weight of a solid body in the porous separator.

In the case in which the content of the crosslinking agent is greater than the upper limit, crosslinking is not completely performed. As a result, the crosslinking agent may serve locally as a plasticizer, and therefore the tensile strength of the porous separator is rather remarkably reduced, which is undesirable.

In the case in which the content of the crosslinking agent is greater than 20 wt %, the ion conductivity of the porous separator may become low due to a low content of inorganic materials and the mechanical properties of the porous separator such as thermal shrinkage may be deteriorated.

In the present invention, the crosslinking agent reacts at a specific temperature to have a three-dimensional net-shaped structure. The density of the porous separator is increased due to the characteristics of the net-shaped structure, whereby the physical properties, particularly the rigidity, are improved. The electron migration is affected due to the characteristics of the net-shaped structure, whereby the insulation resistance is increased.

The reaction temperature of the crosslinking agent may be 120° C. to 160° C., preferably 130° C. to 150° C. The crosslinking agent, which has a linear structure at temperatures lower than the above reaction temperature range, reacts when the reaction temperature of the crosslinking agent reaches the above reaction temperature range, whereby a three-dimensional net-shaped structure is formed through crosslinking.

In the case in which the reaction temperature of the crosslinking agent is lower than 120° C., the crosslink joints of the crosslinking agent are not separated from each other, whereby it is difficult for the crosslinking agent to perform a crosslinking reaction, which is undesirable. In the case in which the reaction temperature of the crosslinking agent is higher than 160° C., the crosslinking agent or the binder used together with the crosslinking agent may melt, which is also undesirable.

In addition, since the porous separator according to the present invention further includes a crosslinking agent in addition to the inorganic particles and the binder, the porous separator may have a high breakdown voltage even though the separator substrate is omitted.

Specifically, in the case in which foreign matter, such as iron (Fe), which is a conductive material, is applied to the porous separator according to the present invention, it is confirmed that the porous separator has a breakdown voltage value almost the same as the breakdown voltage value of a separator including a separator substrate that is used for a secondary battery for vehicles. In addition, there is little difference between the breakdown voltage of the porous separator before the conductive material is applied and the breakdown voltage of the porous separator after the conductive material is applied.

2) Inorganic Particles

The inorganic particles may form empty spaces among the inorganic particles, and thereby may form micro pores and maintain a physical shape as a spacer. The physical characteristics of the inorganic particles are not generally changed at a temperature of 200° C. or more.

The inorganic particles are not particularly restricted, as long as the inorganic particles are electrochemically stable. That is, the inorganic particles that can be used in the present invention are not particularly restricted as long as the inorganic particles are not oxidized and/or reduced within the operating voltage range (e.g. 0 to 5 V based on Li/Li+) of a battery to which the inorganic particles are applied. Particularly, in the case in which inorganic particles having high electrolyte ion transfer ability are used, it is possible to improve the performance of an electrochemical device. Consequently, it is preferable for the electrolyte ion transfer ability of the inorganic particles to be as high as possible. In addition, in the case in which the inorganic particles have high density, it may be difficult to disperse the inorganic particles at the time of forming the porous separator, and the weight of a battery may increase at the time of manufacturing the battery. For these reasons, it is preferable for the density of the inorganic particles to be low. In addition, in the case in which the inorganic particles have high permittivity, the degree of dissociation of electrolyte salt, such as lithium salt, in a liquid electrolyte may increase, thereby improving the ion conductivity of the electrolytic solution.

For the reasons described above, the inorganic particles may be high-dielectric inorganic particles having a dielectric constant of 1 or more, preferably 10 or more, inorganic particles having piezoelectricity, inorganic particles having lithium ion transfer ability, alumina hydrate, or a mixture of two or more thereof.

Examples of the inorganic particles having a dielectric constant of 1 or more may include $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, or a mixture thereof. However, the present invention is not limited thereto.

The inorganic particles having piezoelectricity are a material that is a nonconductor at normal pressure but, when a certain pressure is applied thereto, exhibits conductivity due to a change in the internal structure thereof. In the case in which the inorganic particles have a high dielectric value, e.g. a dielectric constant of 100 or more, and the inorganic particles are tensioned or compressed with a certain pressure, electric charges are generated. One face is charged as a positive pole and the other face is charged as a negative pole, whereby a potential difference is generated between the two faces.

In the case in which inorganic particles having the above-mentioned characteristics are used, a short circuit may occur in both electrodes in the event of an external impact, such as local crushing or an impact with a nail. At this time, however, the positive electrode and the negative electrode may not directly contact each other due to the inorganic particles coated on the porous separator, and potential differences in particles may occur due to the piezoelectricity of the inorganic particles. Accordingly, electron migration, namely, fine current flow, is achieved between the two electrodes, whereby the voltage of the battery is gradually reduced, and therefore the stability of the battery may be improved.

Examples of the inorganic particles having piezoelectricity may include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3\text{-}PbTiO_3$ (PMN-PT) hafnia ($HfO_2$), and a mixture thereof. However, the present invention is not limited thereto.

The inorganic particles having lithium ion transfer ability are inorganic particles that contain lithium elements and transport lithium ions without storing lithium. The inorganic particles having lithium ion transfer ability may transfer and transport lithium ions due to a kind of defect present in a particle structure. Consequently, lithium ionic conductivity in the battery may be improved, and therefore the battery performance may be improved.

Examples of the inorganic particles having lithium ion transfer ability may include lithium phosphate ($Li_3PO_4$), lithium titanium phosphate ($Li_xTi_y(PO_4)_3$, where 0<x<2 and 0<y<3), lithium aluminum titanium phosphate ($Li_xAl_yTi_z(PO_4)_3$, where 0<x<2, 0<y<1, and 0<z<3), $(LiAlTiP)_xO_y$-based glass (where 0<x<4 and 0<y<13) such as $14Li_2O\text{-}9Al_2O_3\text{-}38TiO_2\text{-}39P_2O_5$, lithium lanthanum titanate ($Li_xLa_yTiO_3$, where 0<x<2 and 0<y<3), lithium germanium thiophosphate ($Li_xGe_yP_zS_w$, where 0<x<4, 0<y<1, 0<z<1, and 0<w<5) such as $Li_{3.25}Ge_{0.25}P_{0.75}S_4$, lithium nitride ($Li_xN_y$, where 0<x<4 and 0<y<2) such as $Li_3N$, $SiS_2$-based glass ($Li_xSi_yS_z$, where 0<x<3, 0<y<2, and 0<z<4) such as $Li_3PO_4\text{—}Li_2S\text{—}SiS_2$, $P_2S_5$-based glass ($Li_xP_yS_z$, where 0<x<3, 0<y<3, and 0<z<7) such as $LiI\text{—}Li_2S\text{—}P_2S_5$, and a mixture thereof. However, the present invention is not limited thereto.

The alumina hydrate may be classified as crystalline alumina hydrate or gel-type alumina hydrate depending on the method of manufacturing the same. Examples of the crystalline alumina hydrate may include gibbsite $_i$-Al(OH)$_3$, bayerite Al(OH)$_3$, diaspore $_i$-AlOOH, and boehmite $_i$-AlOOH, and the gel-type alumina hydrate may be aluminum hydroxide, which is prepared by depositing an aqueous solution containing aluminum ions using ammonia. Preferably, boehmite $_i$-AlOOH may be used as the gel-type alumina hydrate.

In the case in which the inorganic particles having high permittivity, the inorganic particles having piezoelectricity, the inorganic particles having lithium ion transfer ability, and the alumina hydrate are used together, the effects obtained through these ingredients may be further improved.

The size of each of the inorganic particles is not particularly restricted. In order to form a film having a uniform thickness and to achieve appropriate porosity, however, each of the inorganic particles may have a size of 0.001 μm to 10 μm. In the case in which the size of each of the inorganic particles is less than 0.001 μm, dispersibility is reduced, whereby it is difficult to adjust the physical properties of the porous separator. In the case in which the size of each of the inorganic particles is greater than 10 μm, the thickness of a separator manufactured with the same content of a solid body is increased, whereby the mechanical properties of the separator are deteriorated. In addition, a short circuit may easily occur in the battery when the battery is charged and discharged due to excessively large-sized pores.

3) Polymer Binder

The polymer binder may become a gel when the polymer binder is impregnated with a liquid electrolytic solution, whereby the polymer binder may have a characteristic of exhibiting high rate of electrolytic solution impregnation. In fact, in the case in which the polymer binder is a polymer having a high rate of electrolytic solution impregnation, an electrolytic solution injected after the assembly of a battery permeates into the polymer, and the polymer impregnated with the electrolytic solution exhibits electrolyte ion transfer ability. In addition, compared to a conventional hydrophobic polyolefin-based separator, wetting of the porous separator in the electrolytic solution may be improved, and it is possible to use polar electrolytic solutions for batteries, which has been difficult conventionally. Consequently, the polymer binder may have a polymer with solubility parameter of 15 $MPa^{1/2}$ to 45 $MPa^{1/2}$, preferably 15 $MPa^{1/2}$ to 25 $MPa^{1/2}$ and 30 $MPa^{1/2}$ to 45 $MPa^{1/2}$. In the case in which the solubility parameter of the polymer binder is less than 15

$MPa^{1/2}$ and greater than 45 $MPa^{1/2}$, it is difficult to impregnate the polymer binder with a general electrolytic solution for batteries.

Specifically, the polymer binder may be at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene terpolymer (EPDM), sulfonated EPDM, styrene butadiene rubber (SBR), TFE, fluoro rubber, and polyimide. Preferably, the polymer binder may be at least one selected from the group consisting of PVdF, TFE and polyimide.

4) Initiator and Reaction Catalyst

The porous separator may further include an initiator for reaction with the crosslinking agent in order to improve the physical properties of the porous separator through the crosslinking reaction.

The initiator may be an azo-based compound or a peroxide-based compound. Specifically, the azo-based compound may be at least one selected from among 2,2'-azobis(2-methylbutyronitrile), 2,2'-azobis(isobutyronitrile), 2,2'-azobis(2,4-dimethylvaleronitrile), and 2,2'-azobis(4-methoxy-2,4-dimethylvaleronitrile). Preferably, the azo-based compound is 2,2'-azobis(isobutyronitrile).

The peroxide-based compound may be at least one selected from among tetramethylbutyl peroxyneodecanoate, bis(4-butylcyclohexyl)peroxydicarbonate, di(2-ethylhexyl) peroxydicarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethylhydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide.

5) Characteristics of Separator

Compared to a conventional separator, the porous separator according to the present invention is configured to have a structure including no separator substrate, whereby the strength of the porous separator may be low. For this reason, the porous separator may have a relatively large thickness. The thickness of the porous separator may range from 5 μm to 30 μm.

In the case in which the thickness of the porous separator is less than 5 μm, the strength of the porous separator is low, whereby the porous separator may be easily damaged, which is undesirable. In the case in which the thickness of the porous separator is greater than 30 μm, the overall thickness of the electrode assembly is increased, whereby the capacity of the battery may be reduced, which is also undesirable.

The porous separator may have an air permeability of 50 sec/100 cc to 4,000 sec/100 cc. In the case in which the air permeability of the porous separator is less than 50 sec/100 cc, the insulation property of the porous separator is very low, which is undesirable. In the case in which the air permeability of the porous separator is greater than 4,000 sec/100 cc, the impregnation of the porous separator with the electrolytic solution and the ion conductivity of the separator become low, which is also undesirable.

The physical properties of the porous separator are affected by the reaction temperature and the reaction time. As the reaction temperature and the reaction time are increased, the extent of crosslinking is increased.

6) Construction and Application of Electrode Assembly

The present invention also provides an electrochemical device including a positive electrode, a negative electrode, the porous separator interposed between the positive electrode and the negative electrode, and an electrolyte. Here, the electrochemical device may be a lithium secondary battery.

The positive electrode may be manufactured by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent accounts for 1 to 30 wt % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black®, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 wt % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode material to a negative electrode current collector and drying the same. The above-described components may be selectively further included as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO$, (Me: Mn, Fe, Pb, Ge; Me': Al, B, P, Si, Group 1, 2 and 3 elements of the periodic table, halogen; $0<x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

In accordance with another aspect of the present invention, there is provided a battery pack including the electrochemical device.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor; an electric automobile, such as an electric vehicle (EV), a hybrid electric vehicle (HEV), or a plug-in hybrid electric vehicle (PHEV); an electric two-wheeled vehicle, such as an electric bicycle (E-bike) or an electric scooter (E-scooter); an electric golf cart; and a power storage system. However, the present invention is not limited thereto.

The structure and manufacturing method of the device are well known in the art to which the present invention pertains, and a detailed description thereof will be omitted.

EXAMPLE

Hereinafter, the present invention will be described in detail with reference to the following Examples and Experimental Example; however, the present invention is not limited by the Examples and the Experimental Example. The Examples may be modified into various other forms, and the scope of the present invention should not be interpreted as being limited by the Examples, which will be described in detail. The Examples are provided in order to more completely explain the prevent invention to a person who has average knowledge in the art to which the present invention pertains.

Example 1

A slurry was manufactured such that the content of a solid body including boehmite (AlO(OH)), as inorganic particles, polyvinylidene fluoride-hexafluoropropylene copolymer (PVdF-HFP, 5130), as a binder, and a compound represented by Chemical Formula 4, as a crosslinking agent, mixed in a ratio of 78:20:2, became 18 wt % of the total weight of the slurry.

Specifically, 28.08 g of boehmite (AlO(OH)), 7.2 g of PVdF-HFP, and 0.72 g of the compound represented by Chemical Formula 4 were added to 164 g of acetone in order to manufacture a slurry. The slurry was formed so as to have the shape of a separator and then dried at 150° C. for 30 minutes in order to manufacture a separator. After the crosslinking reaction, the separator was further dried at ambient temperature in order to complete the separator.

Example 2

A separator was manufactured using the same method as in Example 1, except that 0.0072 g of 2,2'-azobis(isobutyronitrile), as an initiator, was added to the slurry manufactured according to Example 1.

Example 3

A separator was manufactured using the same method as in Example 1, except that a compound represented by Chemical Formula 5 was used in place of the compound represented by Chemical Formula 4 in the slurry of Example 1.

Example 4

A separator was manufactured using the same method as in Example 2, except that the compound represented by Chemical Formula 5 was used in place of the compound represented by Chemical Formula 4 in the slurry of Example 2.

Comparative Example 1

A separator was manufactured using the same method as in Example 1, except that a solid body including boehmite (AlO(OH)) and polyvinylidene fluoride-hexafluoropropylene copolymer (PVdF-HFP, 5130), mixed at a ratio of 78:22, was used without the compound represented by Chemical Formula 4 and the compound represented by Chemical Formula 5, as crosslinking agents.

Experimental Example 1

The volumetric resistivity, the electrical resistance, the tensile strength, the swelling, the air permeability, and the thickness of the separators according to Example 1, Example 2, Example 3, Example 4, and Comparative Example 1 were measured.

TABLE 1

| Experiment | Crosslinking agent | Initiator | Volumetric resistivity [T$\Omega$*cm] | Resistance [$\Omega$] | Tensile strength [kg/cm2] | Swelling [%] | Air permeability [sec/100 cc] |
| --- | --- | --- | --- | --- | --- | --- | --- |
| Example 1 | Chemical Formula 4 2% | X | 150 | 1.80 | 145 | 4.5 | 1010 |
| Example 2 | Chemical Formula 4 2% | ○ | 161.5 | 1.75 | 170 | 2.0 | 1022 |
| Example 3 | Chemical Formula 5 2% | X | 77 | 1.95 | 150 | 5.0 | 1280 |
| Example 4 | Chemical Formula 5 2% | ○ | 78.7 | 1.85 | 179 | 2.3 | 1226 |
| Comparative Example 1 | — | — | 76.9 | 1.75 | 151 | 3.5 | 1706 |

INDUSTRIAL APPLICABILITY

As is apparent from the above description, a porous separator for electrochemical devices according to the present invention does not include a polyolefin substrate, which is used as a separator substrate of a conventional separator, and is made of a material including inorganic particles, a binder, and a crosslinking agent. Consequently, it is possible to solve a problem in which the thermal stability of the separator substrate is low. Furthermore, the crosslinking agent compound forms a three-dimensional net-shaped structure, whereby it is possible to remarkably improve the insulation of the separator.

In addition, since the crosslinking agent is changed from a linear structure to a three-dimensional net-shaped structure, the tensile strength and elongation of the separator are improved, whereby the likelihood of damage to the separator is reduced. Consequently, it is possible to prevent a short circuit in a battery.

In addition, it is advantageous in that it has high stability in a high temperature environment, excellent electrolyte impregnation characteristic, and high ion transfer ability.

The invention claimed is:

1. A porous separator for electrochemical devices, which provides electrical insulation between a positive electrode and a negative electrode, wherein
the porous separator does not include a polyolefin substrate, and comprises a composition comprising inorganic particles, a polymer binder for coupling between the inorganic particles, and a crosslinking agent that has undergone a crosslinking reaction,
wherein the crosslinking agent is represented by Chemical Formula 4, Chemical Formula 4

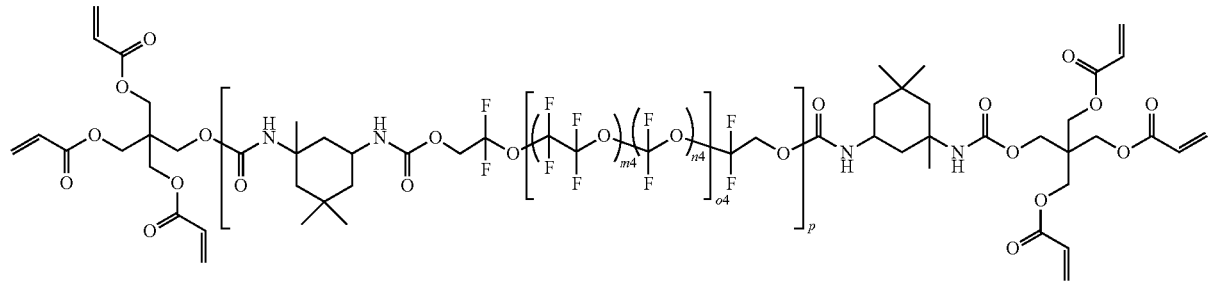

in Chemical Formula 4, m4 is an integer of 1 to 100, n4 is an integer of 0 to 30, o4 is an integer of 1 to 1,000, a weight average molecular weight of Chemical Formula 4 is 1,000 to 100,000, and p is a variable dependent thereon.

2. The porous separator according to claim 1, wherein the inorganic particles include dielectric inorganic particles having a dielectric constant of 1 or more, inorganic particles having piezoelectricity, inorganic particles having lithium ion transfer ability, alumina hydrate, or a mixture of two or more thereof.

3. The porous separator according to claim 1, wherein the inorganic particles include at least one selected from the group consisting of $Al_2O_3$, AlOOH, $SiO_2$, MgO, $TiO_2$ and $BaTiO_3$.

4. The porous separator according to claim 1, wherein a crosslinking reaction temperature of the crosslinking agent is 120° C. to 160° C.

5. The porous separator according to claim 1, wherein a content of the crosslinking agent is greater than 2 wt % and equal to or less than 5 wt % of a total weight of a solid body in the porous separator.

6. The porous separator according to claim 1, wherein the porous separator has a thickness of 5 μm to 30 μm.

7. The porous separator according to claim 1, wherein the porous separator has an air permeability of 50 sec/100 cc to 4,000 sec/100 cc.

8. The porous separator according to claim 1, wherein the polymer binder comprises at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene terpolymer (EPDM), sulfonated EPDM, styrene butadiene rubber (SBR), TFE, fluoro rubber, and polyimide.

9. The porous separator according to claim 8, wherein the polymer binder comprises at least one selected from the group consisting of polyvinylidene fluoride (PVdF), tetrafluoroethylene (TFE) and polyimide.

10. The porous separator according to claim 1, wherein the porous separator further comprises an initiator and/or a reaction catalyst.

11. The porous separator according to claim 10, wherein the initiator comprises an azo-based compound or a peroxide-based compound.

12. The porous separator according to claim 11, wherein the azo-based compound comprises at least one selected from among 2,2'-azobis(2-methylbutyronitrile), 2,2'-azobis(isobutyronitrile), 2,2'-azobis(2,4-dimethylvaleronitrile), and 2,2'-azobis(4-methoxy-2,4-dimethylvaleronitrile).

13. The porous separator according to claim 11, wherein the peroxide-based compound comprises at least one selected from among tetramethylbutyl peroxyneodecanoate, bis(4-butylcyclohexyl)peroxydicarbonate, di(2-ethylhexyl) peroxydicarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethylhydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, or dibenzoyl peroxide.

14. An electrochemical device comprising the porous separator according to claim 1.

\* \* \* \* \*